United States Patent [19]

Legan

[11] 4,045,316

[45] Aug. 30, 1977

[54] PHOTOCHEMICAL PROCESS FOR DECONTAMINATING GASEOUS OR VAPOROUS STREAMS

[75] Inventor: Robert W. Legan, Houston, Tex.

[73] Assignee: Shintech Incorporated, Houston, Tex.

[21] Appl. No.: 581,239

[22] Filed: May 27, 1975

[51] Int. Cl.² .......................... B01J 1/10; B01K 1/00
[52] U.S. Cl. .......................... 204/158 R; 204/162 R; 250/527; 204/157.1 R
[58] Field of Search .............. 204/158 R, 162 R; 250/527

[56] References Cited

U.S. PATENT DOCUMENTS

| 3,657,087 | 4/1972 | Scott | 204/158 R |
| 3,844,914 | 10/1974 | Marchison | 204/158 R |
| 3,977,952 | 8/1976 | Knoevenagel et al. | 204/157.1 R |
| 3,984,296 | 10/1976 | Richards | 204/157.1 R |

OTHER PUBLICATIONS

Chemistry & Industry (Jan. 23, 1971) pp. 116-119, Stiff.

*Primary Examiner*—Howard S. Williams
*Attorney, Agent, or Firm*—Roylance, Abrams, Berdo & Kaul

[57] ABSTRACT

A process for photochemically treating hydrocarbons and halogenated or partially oxidized hydrocarbons in a gaseous or vaporous mixture, by exposing the mixture to ultraviolet light, preferably of relatively short wavelength in the presence of oxygen or its allotropes, in order to oxidize the hydrocarbons to very simple compounds.

13 Claims, 2 Drawing Figures

PHOTOCHEMICAL PROCESS FOR DECONTAMINATING GASEOUS OR VAPOROUS STREAMS

This invention relates primarily to the decontamination of noxious hydrocarbons in gaseous or vaporous mixtures by the photochemical interaction with activated oxygen species to oxidize the contaminants to simple compounds.

BACKGROUND OF THE INVENTION

In recent years legislation has been providing stricter regulation over the emission of contaminants into the atmosphere. In most instances governmental standards rigidly control the concentration of pollutants to within stringent limits. The economic impact of such control on certain industries has been severe. In some situations factories have been forced to close their doors and cease operations because conformance to the new regulations has involved complete replacement of elaborate production equipment or has involved introducing procedures that were not economically feasible. For example, a Federal regulation promulgated in 1974 stipulates that within a prescribed time period, concentrations of vinyl chloride monomer (VCM), a suspected carcinogen, in industrial atmospheres must not exceed one part per million, a requirement so stringent as compared with existing practice that many firms have projected complete plant shutdowns with consequent idling of thousands of employees. By means of the present invention, atmospheric emissions containing certain environmental pollutants in light or heavy concentrations become drastically decontaminated through improved photochemical oxidation procedures.

STATE OF THE ART

With specific reference again to vinyl chloride monomer, several processes have been proposed to reduce the concentration of contaminants in emissions, with varying degrees of success. Among these, solvent absorption, while theoretically attainable, becomes impractical as applied to stack emissions of any substantial capacity because of the unreasonably large flow of solvent required in a stripping column, the impractical size of such a solvent absorption column, and the uneconomically vast energy needs for the system. Consequently, the approach has not been deemed commercially feasible.

Incineration of vinyl chloride has been considered where ambient air is available as a diluent. However, supplemental fuel is required in proportion to the quantity of air used, and since the fuel needs become enormous especially with dilute quantities of VCM in the emission, and especially where substantially complete removal of the VCM is required, the process becomes uneconomical. It has been estimated that for poly (vinyl chloride) production, fuel needs for incineration entail from 33 percent to over 400 percent increases in overall plant fuel consumption, depending upon the type of plant involved. Incinerators have a reputation for mechanical unreliability, and the unusually high maintenance costs additionally militate heavily against the wide-scale adoption of incineration as a control process.

Adsorption of organic vapors by passing them through beds of activated carbon has been tried with some success, but some recent tests indicate a typical 50 percent loss in bed capacity and a 300 percent increase in regeneration time with less than 3 days' continuous service, so that to date the technology as applied to VCM has not been demonstrated commercially.

The use of ozone as an oxidizing agent is known in the art. Ozonolysis of unsaturated organic liquids to yeild aldehydes and ketones is a common analytical procedure. William T. Miller, in U.S. Pat. Nos. 2,712,554 and 2,712,555 teaches the use of ozone in the partial oxidation of hydrocarbons using ozone in the liquid and vapor phase respectively. Miller's technique is preparative in nature, in that it is useful for the preparation of specific partially oxidized compounds. Neither Miller's method nor classical ozonolysis is known to be sufficiently reactive to oxidize hydrocarbons to the simple products necessary to achieve the objectives of the present invention.

SUMMARY OF THE INVENTION

The present invention is primarily concerned with the decontamination of gaseous or vaporous streams, typically of emissions into the atmosphere from industrial processes, where the contamination consists of certain hydrocarbons, halogenated hydrocarbons and/or partially oxidized hydrocarbons.

The present process utilizes photochemical generation of activated oxygen species to effect the oxidation of these contaminants to simple compounds. Essentially the process comprehends exposing the contaminated gaseous stream to ultraviolet light in the presence of oxygen and/or ozone. In a preferred embodiment, surprising advantages are derived from the use of ultraviolet light having component wave lengths below 2100 A combined with specified quantities of ozone.

The principal object of the present invention is to provide a new and useful method of and apparatus for decontaminating gaseous or vaporous streams containing certain hydrocarbons, halogenated hydrocarbons and/or partially oxidized hydrocarbons; and, to provide such a method and apparatus wherein use is made of ultraviolet light in the presence of activated oxygen species to oxidize these contaminants efficiently and economically to simple compounds such as carbon dioxide, water, hydrogen halides and halogen gases. These and other objects will become more apparent from the following detailed description, in conjunction with the accompanying drawing, wherein:

FIG. 1 is a diagrammatic view of a typical apparatus for carrying out the present process; and FIG. 2 is a graph summarizing experimental data illustrating advantages to be obtained with the present process.

DETAILED DESCRIPTION

Figure 1:
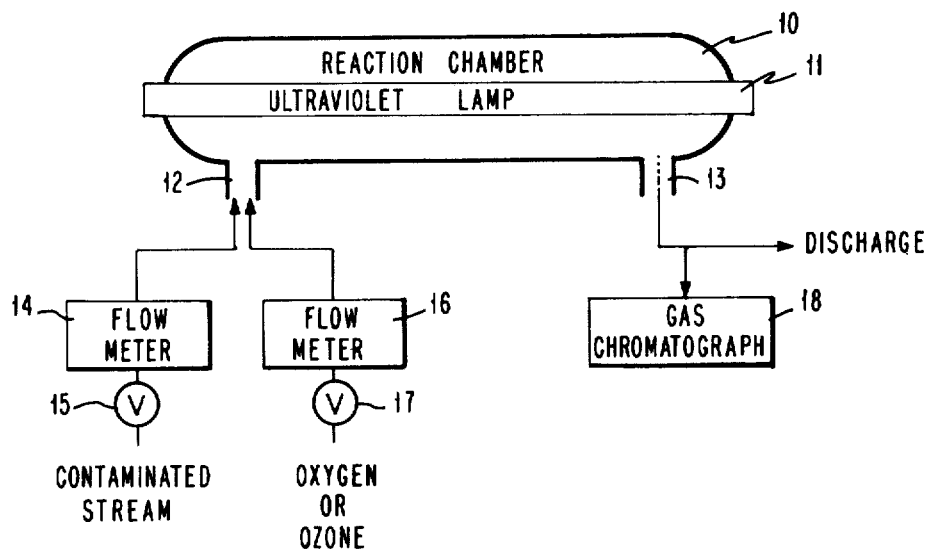

In connection with the present decontamination process, the compounds comprehended as contaminants are constrained to the following classes:

A. Saturated and unsaturated hydrocarbons containing 2-8 carbon atoms. Examples of such hydrocarbons include but are not limited to ethene (ethylene), ethyne (acetylene), propane, iso-butane, 1,3 butadiene, 2-methyl butane, 1-pentyne and isoprene 1,2,4 trimethyl pentane, n-heptane, toluene and cyclohexane.

B. Halogen-substituted variants of the hydrocarbons in the foregoing Class A. Halogen substituents are chosen from the group containing fluorine ($-F$), Chlorine($-Cl$), Bromine ($-Br$) and Iodine ($-I$). Examples of such halogen-substituted hydrocarbons include but are not limited to 1,1,1, trichloroethylene, vinyl fluroide, vinyl chloride, vinyl bromide, vinylidene chloride, chloroprene, ethylene dichloride, 1-bromo-3-chloropropane, fluorotricholorethylene and secbutyl chloride.

C. Partially oxidized variants of the hydrocarbons and halogen substituted hydrocarbons of the foregoing Classes A and B. Such compounds result from inclusion of oxygen-containing groups such as hydroxyl (—OH), keto

aldehyde

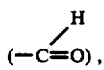

ether(C—O—C), ester

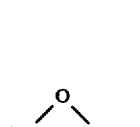

epoxy

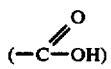

peroxy (—C—O—O—C—) and acid $$(-C\overset{O}{\underset{\diagup}{-}}OH)$$

in the structure of saturated and unsaturated hydrocarbons containing 2-8 carbon atoms. Typical examples of such partially oxidized hydrocarbons include, but are not limited to: ethylene oxide, acetic acid, propylene chlorohydrin, propylene glycol, propagyl chloride, vinyl ethyl ether, vinyl acetate and methyl ethyl ketone, tetrahydrofuran and cyclohexanone. Further reference to the term "hydrocarbon" is to be construed to include all such hydrocarbons, halogenated hydrocarbons and partially oxidized hydrocarbons as are described in the foregoing Classes A, B & C.

The streams in which the above-described hydrocarbons are present as contaminants are confined to gaseous and vaporous streams. Such streams typically consist of air or of rather inert gases, such as nitrogen. These gaseous or vaporous hydrocarbon contaminants may be present individually or admixed in concentrations as low as 10 parts per million (Volume basis), up to 80 percent (volume basis). Higher hydrocarbon concentrations generally accelerate the decontaminating process. However, the present decontaminating process is sufficiently reactive to be of considerable interest even well below 1 percent hydrocarbon concentration.

As with many chemical reactions, increased temperature generally accelerates the decontaminating process; however, the photochemical nature of the present process is rather insensitive to temperatures significantly below the thermal oxidation temperatures of the subject hydrocarbons. Consequently, temperature limitations follow from practical considerations, within the range −20° C to 400° C. A preferred embodiment of this process is to conduct the reaction at the near-ambient temperature. Similarly, the decontamination rate will increase with increased ultraviolet radiation intensity. Practical considerations, however, limit energy densities to the range of 10–2000 watts/ft³. The quantum energy of ultraviolet radiation is known to increase with decreasing wavelength, according to the relationship $E = h\lambda$ Where:

$E$ = Quantum Energy (energy/mole)

$h$ = Planck's Constant $\lambda$ = Wavelength (length units)

The pressure at which the decontamination reaction is conducted is again limited by practical considerations. The gaseous or vaporous streams of this process are subject to ordinary gas laws, allowing effective residence time in a continuous reaction vessel to be manipulated by choice of reaction pressure. The decontamination reaction per se is rather insensitive to pressure within ordinary limits of 0.01 to 10 Atm. With the present process, a gaseous or vaporous stream containing certain hydrocarbon contaminants is introduced into a reaction chamber. Ultraviolet light is provided within the reaction chamber to effect a photochemical oxidation reaction. Some species of oxygen must be present. The ultraviolet light is believed to react with both oxygen and ozone to produce various activated species, including atomic oxygen and O, $O_2$ and $O_3$ forms with excited electron states. I have chosen the term "oxygen species" to refer collectively to oxygen, ozone and excited allotropes. Ozone may be supplied to the process in practical quantities of up to 40 volume units ozone per volume unit hydrocarbon. Oxygen can be supplied independently as a component of the atmosphere, from the contaminated stream itself in the case of contaminated air streams, or it can be added from separate oxygen generation or storage facilities. The reaction chamber is designed to provide sufficient time to oxidize the hydrocarbon contaminants to simple products such as carbon dioxide, water and hydrogen halides or halogen gases, where the hydrocarbon contaminant is halogen substituted.

Looking now to the drawing, and more particularly to FIG. 1, apparatus of a type that has been employed successfully in carrying out the principles of the present process comprises a reaction chamber 10, of a size that allows the stream of contaminated gas or vapor to remain within the chamber for a predetermined relatively brief time interval. While the principles of the invention have been found to be applicable to both gaseous and vaporous streams, for simplicity in description such gases and vapors may be referred to hereinafter simply as streams. A suitable source of ultraviolet radiation 11, is located within the chamber so as to irradiate the stream. One or more such radiation sources or lamps 11 may be located in any suitable relation to the chamber and to the path of the gas stream flowing therethrough that provides effective irradiation of the stream. I have successfully used a conventional cylindrical mercury-Vapor tube as the radiation source 11, positioned in generally coaxial relation to an enclosing cylindrical reaction chamber.

The chamber 10, is provided with an inlet port 12 preferably located near one end of the lamp 11, and with an outlet port 13, adjacent to the opposite end of the lamp. The gaseous stream, containing contaminants, is introduced to the chamber through inlet port 12, after passage through a flow meter 14, and the flow of the stream may be controlled by a valve 15. Similarly, oxygen or ozone from a suitable source (not shown), but supplemental to usually minute quantities produced by the lamp 11, is admitted to the chamber 10 as, through port 12, after passage through a flow meter, 16, the flow being controlled by a valve 17. The stream and the ozone or oxygen normally are mixed before or as they enter the chamber and are exhausted, after being irradiated, through outlet port 13. A sample of the discharged stream is fed to a suitable analytical instrument, such as a gas chromatograph 18. The apparatus will become better understood in connection with a detailed description of typical modes of operation, as set forth in the following examples.

EXAMPLE 1

To Illustrate the Sensitivity of Hydrocarbon Decontamination Rate to Ozone Concentration A reaction system, as diagrammatically illustrated in FIG. 1, is equipped with a lamp 11, producing a spectrum typified by radiation at 2537 A.

An air/vinyl chloride stream containing about 100 parts per million (volume basis) of vinyl chloride is introduced into the reaction chamber. Ozone is admixed with the air-vinyl chloride stream in volume ratios to vinyl chloride as indicated in Table 1 below. Flow rates are adjusted to provide a mean residence time of about 60 seconds. Mean residence time is defined as the ratio of effective reaction chamber volume (volume units) to the apparent stream flow rate (volume units/time units).

Concentrations of vinyl chloride in the exiting stream are reported in Table 1 as a percentage of the entering concentration for each ozone concentration indicated. Conditions of pressure and temperature within the reaction chamber are approximately ambient.

TABLE 1

| Ozone/Vinyl Chloride Ratio (Volume Ratio) | Vinyl Chloride Exiting Reaction Chamber, Percent to Entering Concentration |
|---|---|
| 1 | 88% |
| 2 | 74% |
| 3 | 62% |
| 5 | 40% |
| 8 | 19% |
| 13 | 5% |

It is apparent from the foregoing that considerable improvement in degree of decontamination can be obtained by supplying greater proportions of ozone to the process.

EXAMPLE 2

To Illustrate the Effect of the addition of Ultraviolet Light on the Decontamination Rate A vinyl chloride/air stream containing about 100 parts per million (by volume) of vinyl chloride is utilized. Ozone is admixed with the vinyl chloride/air in the ratio of one weight unit of ozone to each weight unit of vinyl chloride, with conditions of temperature and pressure being held near ambient.

2A. With the ultraviolet lamp inactive, entering flow rates are varied to generate several discrete mean residence times. Entering and exiting vinyl chloride concentrations are measured and the differential determined. From this information, an expression for the overall reaction rate constant is calculated and reported in Table 2. 2B. The procedure of part 2A is reproduced with the ultraviolet lamp activated. A second reaction constant is calculated and reported in Table 2. 2C. The ultraviolet lamp of Example 1 and Example 2B is replaced by a similar lamp with quartz windows rather than glass. The quartz is known to pass a radiation peak at 1849 A normally absorbed by glass. The procedure of Part 2B is reproduced utilizing this lamp. A third reaction rate constant is determined and reported in Table 2.

TABLE 2

| Example | Description | Relative Reaction Rate Constant |
|---|---|---|
| 2A | Ultraviolet source inactive | 1 |
| 2B | Ultraviolet radiation at 2537 Å | 10 |
| 2C | Ultraviolet radiation at both 1849 Å and 2537 Å | 230 |

It is apparent from Table 2, that sharply increased reaction rates occur when ultraviolet light is employed, and that dramatically higher reaction rates occur when the 1894 A component of the mercury vapor spectrum irradiates the stream.

EXAMPLE 3

To illustrate the Application of the Present Process to Break Very Strong Chemical Bonds The apparatus as described in Example 2C including the ultraviolet source radiating at both 1849 A and 2537 A is utilized. An airstream containing about 100 parts per million (by volume) of vinyl chloride is introduced to the reaction chamber along with three weight units of ozone for each weight unit of vinyl chloride, with conditions of temperature and pressure remaining at approximately ambient.

3A. Ozone and vinyl chloride/air mixture flow rates are adjusted to yield about 6 seconds mean residence time. The gas chromatograph indicates substantial reduction of vinyl chloride from the gas being exhausted from the reaction chamber. However, a strong new peak identified as acetylene is observed on the gas chromatograph.

3B. The flow rates of Example 3A are adjusted to increase mean residence time within the reaction chamber to about 40 seconds. Neither vinyl chloride nor acetylene peaks are observed on the gas chromatograph.

It is apparent from the foregoing that the elimination of acetylene indicates the capability of the process to break very strong carbon-carbon triple bonds.

EXAMPLE 4

To Illustrate the Practical Desirability of using Photochemically Activated Oxygen Species in the Destruction of Hydrocarbon Contaminants as Opposed to Using Either Photochemical Decomposition or Ozonolysis alone The apparatus as described in Example 2C including the ultraviolet source radiating at both 1849 A and 2537 A is utilized with conditions of temperature and pressure remaining at approximately ambient.

4A. A stream containing about 100 parts per million (by volume) of vinyl chloride in air is introduced into the reaction chamber. A supplemental stream containing about one weight unit of ozone per weight unit of vinyl chloride is similarly introduced. Flow rates are manipulated to provide 10 seconds mean residence time. With the ultraviolet source not activated, the gas chromatograph determines the concentration of vinyl chloride in the gas exhuasted from the reaction chamber. The weight fraction of vinyl chloride desstroyed is calculated and recorded in Table 3.

4B. A stream containing about 100 parts per million (by volume) of vinyl chloride in nitrogen is introduced into the reaction chamber. No ozone air, or other oxygen souce, is introduced. The vinyl chloride/nitrogen mixture flow rate is adjusted to provide 10 seconds mean residence time, an ultraviolet source is activated. The concentration of vinyl chloride in the exhaust gas as compared to that in the gas entering the reaction chamber is again measured and recorded in Table 3.

4C. A stream containing about 100 parts per million (by volume) of vinyl chloride in air is introduced into the reaction chamber. No ozone is added. The procedure of Example 4B is reproduced and the observed concentration of vinyl chloride in the exhaust gas as compared to incoming vinyl chloride concentration is reported in Table 3.

4D. A gas stream containing about 100 parts per million (by volume) of vinyl chloride in air is introduced into the reaction chamber. An ozone stream supplying one weight unit of ozone per weight unit of vinyl chloride is likewise supplied. The procedure of Example 4C is reproduced and the analogous vinyl chloride fraction reported in Table 3.

TABLE 3

| Ex. | Description | Weight Fraction of Vinyl Chloride Destroyed |
|---|---|---|
| 4A | Ozone without Ultraviolet | 0.02 |
| 4B | Ultraviolet without Oxygen or Ozone | 0.06 |
| 4C | Ultraviolet with Airborne Oxygen, No Ozone | 0.85 |
| 4D | Ultraviolet with Airborne Oxygen plus Ozone Supply | 0.98 |

It is apparent from the foregoing, that moderate decontamination results are obtained with ozone alone, that somewhat better results are obtained with 1849 A radiation in the absence of oxygen or ozone, but that dramatically improved decontamination rates occur when the 1849 A radiation is employed in conjunction with ozone or atmospheric oxygen.

Figure 2:
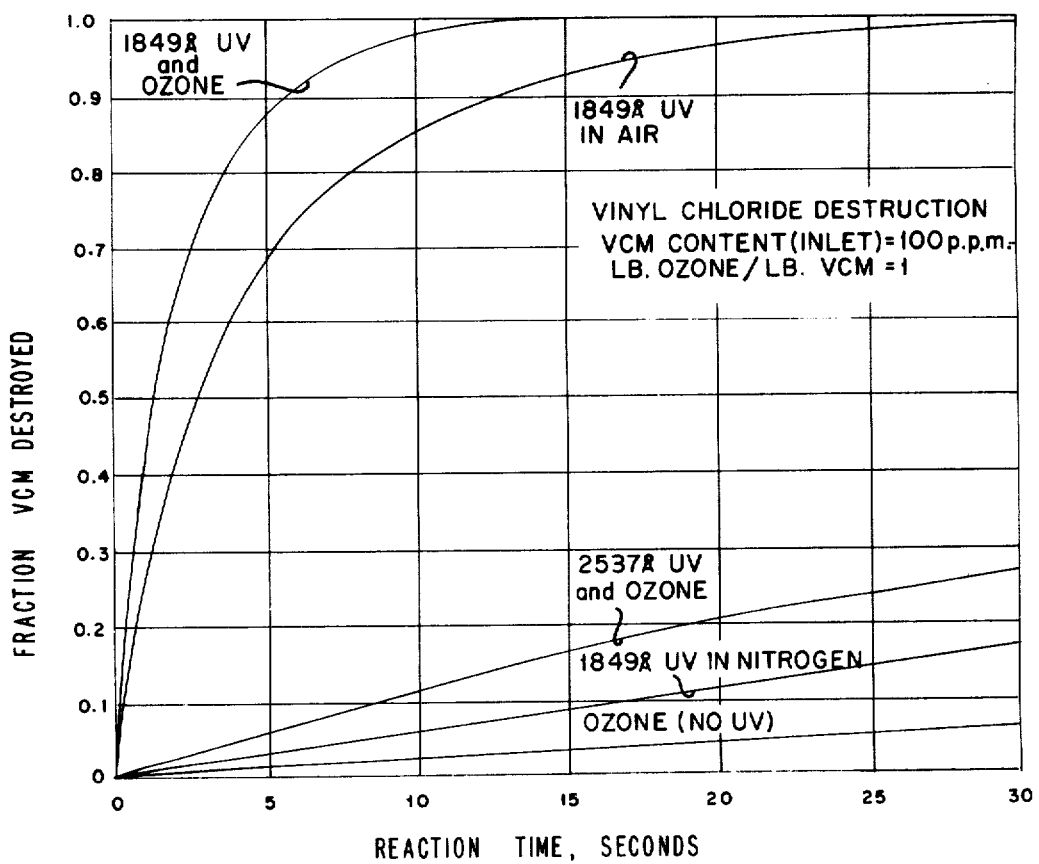

FIG. 2, is a graphical summary compiled from experimental data for vinyl chloride destruction by the present process, and showing the individual and combined effects of air, nitrogen, ozone, and ultraviolet radiation of 2537 A and 1849 A. The graph represents data generated when following the methods outlined in Example 4. By reference to FIG. 2, it will be noted that over 80 percent destruction of VCM can be expected in less than 5 seconds, when the shorter wave length radiation is employed in the presence of ozone. Similar results occur with the shorter wave length radiation in the presence of atmospheric oxygen alone. Neither the ozone or the oxygen alone, nor the shorter wave length alone produces impressive results. Hence the dramatically improved decontamination occurring when these two parameters are combined must be attributed to synergism. The mercury vapor spectrum is characterized by radiation peaks, near 1849 A and 2537 A. Since glass is known to absorb ultraviolet radiation with wavelengths shorter than about 2100 A, ultraviolet sources with quartz windows are substituted in order to pass the shorter wavelength radiations. The improved results with quartz therefore are attributable to wavelengths otherwise absorbed by glass.

It is apparent that the principles of the invention, while herein described primarily in connection with VCM as a contaminant, are applicable to streams containing other hydrocarbons, as mentioned previously in the specification, and I comprehend as coming within the purview of the invention all processes and apparatus properly encompassed by the appended claims.

I claim:

1. A process for photochemically treating a gaseous or vaporous stream containing an oxidizable contaminant, said process comprising exposing said contaminant to ultraviolet radiation from a source of radiation emitting ultraviolet wavelengths shorter than 2100 A in the presence of ozone thereby oxidizing said contaminant to form simple, gaseous products, said ozone being in addition to any ozone formed by said source of ultraviolet radiation.

2. The process of claim 1 wherein said ultraviolet radiation includes components having a wavelength of about 1849 A.

3. The process of claim 2 wherein said contaminant comprises vinyl chloride.

4. The process of claim 1 wherein ozone is present in an amount at least equal to the weight of said contaminant.

5. The process of claim 4 wherein said contaminant comprises vinyl chloride.

6. The process of claim 1 wherein said ultraviolet radiation comprises wavelengths of about 1849 A and said oxidation takes place in the presence of atmospheric oxygen.

7. The process of claim 6 wherein said contaminant comprises vinyl chloride and ozone is present in an amount at least equal to the weight of said vinyl chloride.

8. the process of claim 1 wherein said oxidation takes place in the presence of oxygen.

9. The process of claim 1 wherein said contaminant is present in said stream in an amount of from 10 ppm by volume to 80 percent by volume of said stream.

10. The process of claim 1 wherein said contaminant is irradiated under ambient conditions of temperature and pressure.

11. The process of claim 1 wherein said contaminant comprises vinyl chloride.

12. The process of claim 1 wherein said contaminant is a member selected from the group consisting of
 a. saturated and unsaturated hydrocarbons containing 2-8 carbon atoms,
 b. halogen-substituted saturated and unsaturated hydrocarbons containing 2-8 carbon atoms, and
 c. partially oxidized variants of said hydrocarbons and said halogen-substituted hydrocarbons.

13. The process of claim 1 wherein said ultraviolet radiation is provided with energy densities of from 10 watts to 2000 watts per cubic foot.

* * * * *